United States Patent [19]
Cappeli

[11] 3,871,813
[45] Mar. 18, 1975

[54] MOLD MEMBER FOR CONTACT LENS CONSTRUCTION

[75] Inventor: Quido A. Cappeli, Bronx, N.Y.

[73] Assignee: Danker & Wohlk, Inc., Uniondale, N.Y.

[22] Filed: Apr. 9, 1973

[21] Appl. No.: 349,091

Related U.S. Application Data

[62] Division of Ser. No. 193,380, Oct. 28, 1971, abandoned.

[52] U.S. Cl. ........................ 425/469, 425/DIG. 808
[51] Int. Cl. ............................................. B29d 11/00
[58] Field of Search ........ 425/469, DIG. 808; 264/1

[56] References Cited
UNITED STATES PATENTS

| | | |
|---|---|---|
| 2,644,985 | 7/1953 | Crandon ................ 425/DIG. 808 X |
| 2,664,025 | 12/1953 | Herman ................ 425/DIG. 808 X |
| 3,030,859 | 4/1962 | Elliott .................... 425/DIG. 808 X |

Primary Examiner—Francis S. Husar
Assistant Examiner—David B. Smith
Attorney, Agent, or Firm—Harris, Kern, Wallen & Tinsley

[57] ABSTRACT

A mold member for molding the inner surface of a plastic contact lens formed by moving the flat end face of a metal blank to a starting position in tangential engagement with the axially straight peripheral edge of a grinding wheel and then simultaneously turning the blank and the grinding wheel about their respective axes of rotation while swinging the blank through a predetermined angle about an axis normal to and intersecting the axis of rotation of the blank.

1 Claim, 6 Drawing Figures

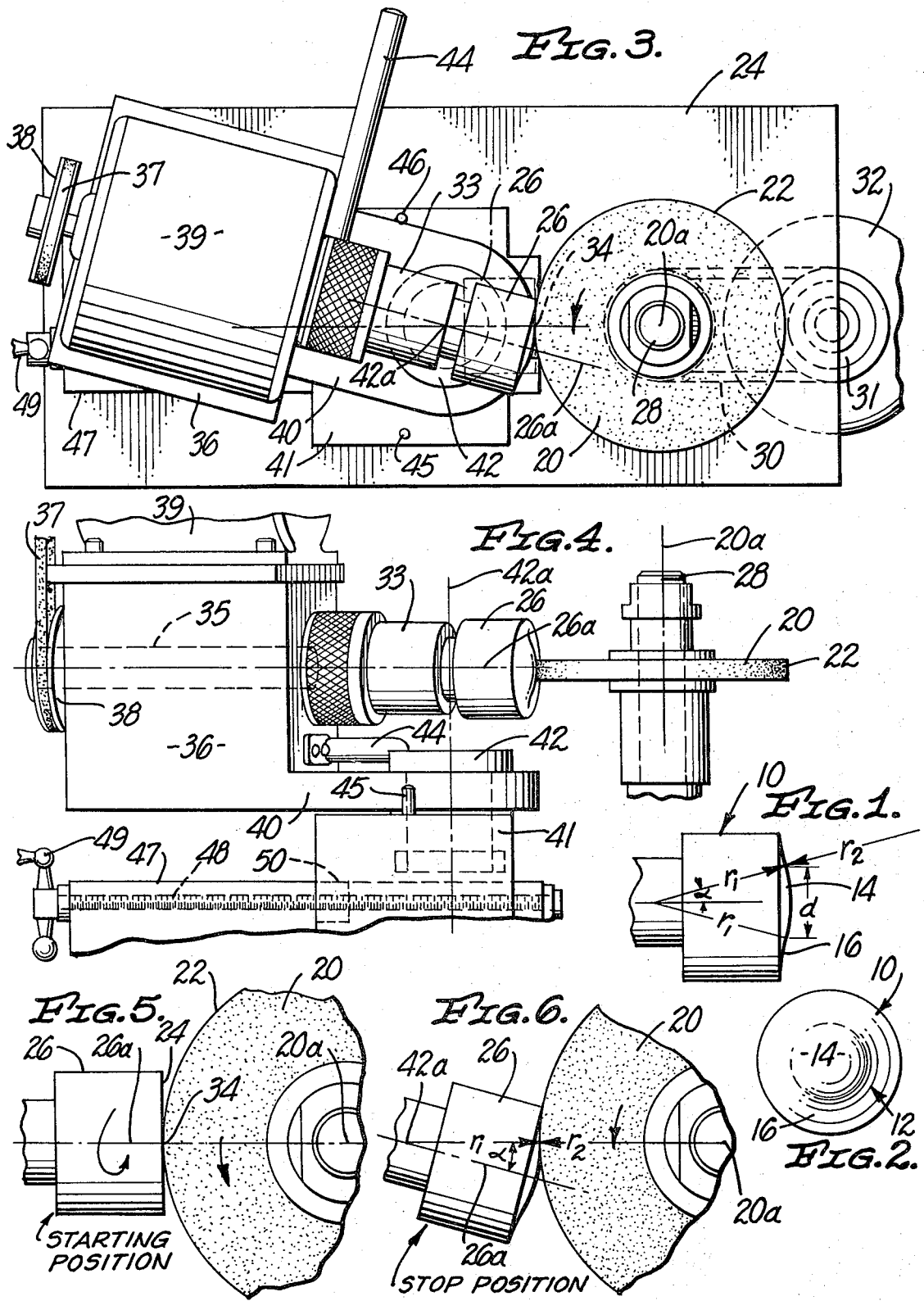

MOLD MEMBER FOR CONTACT LENS CONSTRUCTION

This is a division of application Ser. No. 193,380, filed Oct. 28, 1971 now abandoned.

My invention relates to a mold member for molding plastic contact lenses and more particularly to a novel mold for the inner surface of a contact lens in its method of construction.

The inner surface of a plastic contact lens must be carefully formed to very close tolerances if eye irritation and abrasion are to be avoided. For this reason, tools and particularly the molds used in forming such inner surfaces require careful construction. Because of the multicurved nature of the outer surface of the human eye, the manufacturer of such molds has heretofore involved complex and time consuming operations requiring the use of highly skilled machinists.

My invention therefore has as one of its principal objects the provision of a simple and inexpensive yet highly accurate method of rapidly forming molds for the inner surface of plastic contact lenses.

Another object of my invention is to provide a method of the foregoing character which is particularly useful in forming the inner surfaces of relatively soft plastic contact lenses dimensioned to cover the cornea, bridge the limbal region, and ride on the sclera portion of the eye.

Contact lenses of such general size have heretofore possessed serious limitations. For example, the comfortable wearing time for such lenses has been limited to a few hours. This has been due to corneal misting or halation and eye fatigue presumably caused by the lens cutting off the supply of air to and lacrimal fluid flow in the limbal region of the eye. I have found that a contact lens of relatively soft and pliable plastic material including an inner surface having a slightly convex outer portion for bridging limbal region of the eye does not exert excessive pressure on the cornea or sclera portions of the eye and permits ample air supply to and lacrimal fluid flow in the limbal region. Such a lens is covered by my copending application Ser. No. 193,441 filed Oct. 28, 1971, now abandoned and it is a specific object of this invention to provide a simple method of rapidly producing molds for such lenses; that is molds having a central convex portion dimensioned to form a spherical central corneal portion of the inner surface of the lens, and an outer annular slightly concave portion dimensioned to form an annular slightly concave outer portion of the lens conforming to the annular generally hyperbolic portion of the cornea bridging the limbal region and engaging and riding on an inner annular area of the sclera portion of the eye.

A further object of my invention is to provide a mold of the foregoing character formed by moving the flat end of a metal blank to a starting position in tangential engagement with the axially straight peripheral edge of a grinding wheel and then simultaneously turning the blank and the grinding wheel about their respective axes of rotation while swinging the blank through a predetermined angle about an axis normal to and intersecting the axis of rotation of the blank.

The foregoing as well as other objects and advantages of my invention may be more clearly understood by reference to the following detailed description when considered with the drawing which illustrates by way of example only machinery and method for producing a mold having the foregoing features.

In the drawing:

FIG. 1 is a side view of a mold embodying the features of my invention;

FIG. 2 is an end view of the mold of FIG. 1;

FIG. 3 is a top view of machinery grinding the end face of a metal blank into a mold in accordance with my invention, the starting position for the machinery being in phantom outline;

FIG. 4 is a side view of the machinery of FIG. 3;

FIG. 5 is a top view diagrammatically representing the metal blank in the starting position; and FIG. 6 is a top view diagrammatically representing the metal blank as its end face is ground into a mold.

Generally speaking, and referring to FIGS. 1 and 2, the mold of my invention is particularly useful in forming the inner surface of relatively soft plastic contact lenses for covering the entire cornea and bridging the limbal region of the eye. To accomplish this, the mold comprises a metal tool or mold member 10 having an end face 12. The tool 10 forms the male part of a mold combination and in use with a female mold compresses heated plastic material to form a contact lens of predetermined size and shape. In such an operation, the end face 12 forms the inner surface of the contact lens and, in accordance with my invention, includes a central convex portion 14 surrounded by a slightly concave annular outer portion 16 defining the outer periphery of the end face 12. The convex portion 14 is generally circular and is dimensioned to form the semispherical concave central portion of the inner surface of the lens. The outer annular portion 16 is dimensioned to form an annular slightly concave outer portion of the lens conforming to the annular generally hyperbolic portion of the cornea bridging the limbal region, and engaging and riding on an inner annular area of the sclera portion of the eye. As described more fully in my copending patent application, it is the relatively flat reverse curve of the outer slightly convex portion bridging the limbal region of the eye which provides my contact lens with some of its advantages over previous lenses of a similar size.

With respect to the foregoing, please note that the central portion 14 has a radius of curvature $r_1$ which is smaller than a radius of curvature of $r_2$ of the outer annular portion of the mold. Further, it bears noting that the radii $r_1$ and $r_2$ are substantially collinear at a junction of the curves defining a profile of the mold. This is an important feature of the mold since it insures that there is no noticeable change in the direction of the curves at their junctions and that there will be a smooth transition from the inner to outer regions of the inner surface of the contact lens formed by the mold.

Preferably, the end face 12 of the mold 10 is formed by the method diagrammatically represented in FIGS. 5 and 6 utilizing apparatus similar to that shown in FIGS. 3 and 4.

Preferably, the method of my invention comprises the steps of:

1. mounting a grinding wheel having an axially straight peripheral edge for turning on a central axis of rotation;

2. mounting a metal blank having a flat end face in a starting position with the end face tangent and parallel to the peripheral edge along a line of contact between the grinding wheel and the end face; and 3. simultaneously turning the grinding wheel about its axis of rotation and the blank about a first axis normal to the end face and intersecting the line of contact while swinging the blank to a stop position about a second axis intersecting the first axis and parallel to the line of contact.

The apparatus illustrated in FIGS. 3 and 4 for accomplishing the method includes a grinding wheel 20 having an axially straight peripheral edge 22 for grinding the flat end face 24 of a cylindrical metal blank 26 while the blank is rotated on its longitudinal axis 26a and swung about an axis normal to and intersecting the longitudinal axis. In this regard, the grinding wheel 20 is secured in a horizontal plane for turning on a vertical axis of rotation 20a with a vertical spindle 28; the lower end of the spindle being journalled in a table 29 and turned by a belt 30 extending around a pulley 31 on the drive shaft of a motor 32. The blank 26 is secured in the forward end of a chuck 33 such that the blank lies in the horizontal plane of the grinding wheel 20 with its end face 24 tangent and parallel to the peripheral edge 22 along a vertical line of contact 34 between the wheel and the end face. This defines a starting position for the blank and is depicted in FIG. 1 (phantom outline) and in FIG. 3.

The chuck 33 is carried on the forward end of a horizontal spindle 35 to turn the metal blank 26 on the longitudinal axis 26a. In this regard, the spindle 35 is journalled in an upright amount 36 and turned by a belt 37 extending around a pulley 38 on a drive shaft of a motor 39.

A horizontal foot 40 extends from the base of the mount 36 and rests on and is pivotally secured to the top of a carriage 41, as by a vertical pivot pin 42. The vertical axis 42a of the pivot pin 42 is parallel to the line of contact 34 between the end face 24 and the peripheral edge 22 of the grinding wheel and intersects the longitudinal axis 26a of the blank 26.

A handle 44 extends from the mount 36 to provide means for manually swinging the mount and hence the blank 26 on the vertical axis 42a and between starting and stop positions. The starting and stop positions for the blank may be defined by stop elements 45 and 46 secured to the top of the carriage 41 and adapted to engage the sides of the foot as it is swung about the axis 42a; the stop element 45 engaging one side of the foot in the starting position and the stop element 46 engaging an opposite side of the foot in the stop position. Preferably stop elements 45 and 46 are positioned such that the longitudinal axis 26a swings through an angle $\alpha$ in reaching the stop position; $\alpha$ corresponding to an angle having a tangent substantially equal to $d/2r_1$ where $d$ is the chord length of the desired central optical zone (see FIG. 1) and $r_1$ is the distance between the junction of the axis 26a and 42a and the line of contact 34 along the axis 26a. It will be noted that $d$ is of the order of one-half the diameter of the end face of the tool. As viewed in FIG. 6, such a limitation on $\alpha$ insures that the end face 24 is formed to have the semispherical central portion 14 for defining the desired optical zone of constant curvature, and the annular slightly concave outer portion 16.

To provide means for preadjusting the length of $r_1$, the apparatus shown in FIGS. 3 and 4 includes a way 47 and a lead screw 48 carrying a hand crank 49. The way 47 is secured to the top of the table 29 along a line intersecting the axis 20a. The carriage 41 is adapted to slide along the top of the way 47 and carries a nut 50 for receiving the lead screw 48. To preadjust $r_1$, the blank 26 is mounted in the chuck 33 with the enlarged end thereof adjacent the end of the chuck. The hand crank 49 is then turned to move the carriage toward or away from the grinding wheel. Once the desired displacement of the axis 42a from the line of contact 34 is reached, the chuck 33 is loosened and the blank 26 moved axially until the end face 24 comes into tangential engagement with the peripheral edge 22, the end face being parallel to the peripheral edge along the line of contact 34.

With the blank 26 in the starting position, the grinding wheel 20 and blank are simultaneously turned on their axes of rotation 20a and 26a. The operator then grips the handle 44 and as depicted in FIG. 6 swings the blank on the axis 42a through the angle $\alpha$ to grind the end face of the blank to the desired shape for the mold 10. This operation is relatively quick and does not require the use of a skilled machinist.

In the foregoing description, a preferred form of my mold configuration and method of construction have been described in some detail. However, changes and modifications may be made therein without departing from the spirit of my invention. Accordingly, it is my intention that the scope of my invention be limited only by the terms of the following claims.

I claim:

1. A mold for forming the inner surface of a plastic corneal-type contact lens such that the inner surface includes a semi-spherical central cornea engaging portion and a slightly concave outer annular cornea engaging and limbus bridging portion, said mold comprising:

a mold member having an end face including a central semi-spherical convex portion of radius $r_1$ having substantially the contour of the central portion of the cornea and an outer slightly concave annular portion forming the periphery of said end face and of radius $r_2$ greater than and colinear to $r_1$, and a junction of curves defined by $r_1$ and $r_2$ defining a surface having substantially the contour of the outer annular generally hyperbolic portion of the cornea and bridging the limbus just to the sclera of the eye, the diameter of said portion of radius $r_1$ being of the order of one-half the diameter of said end face.

* * * * *